US012030429B2

(12) United States Patent
Darlage et al.

(10) Patent No.: US 12,030,429 B2
(45) Date of Patent: Jul. 9, 2024

(54) BI-DIRECTIONAL LIGHT SYSTEM (71) Applicant: Valeo North America, Inc., Troy, MI (US)

(72) Inventors: Colby Darlage, Troy, MI (US); Brant Potter, Troy, MI (US); David Egly, Troy, MI (US)

(73) Assignee: Valeo Vision, Bobigny (FR)

( * ) Notice: Subject to any disclaimer, the term of this patent is extended or adjusted under 35 U.S.C. 154(b) by 94 days.

(21) Appl. No.: 17/868,346

(22) Filed: Jul. 19, 2022

(65) Prior Publication Data
US 2023/0339387 A1    Oct. 26, 2023

Related U.S. Application Data

(60) Provisional application No. 63/334,783, filed on Apr. 26, 2022.

(51) Int. Cl.
*B60Q 1/38* (2006.01)
*B60Q 1/26* (2006.01)
(Continued)

(52) U.S. Cl.
CPC ........... *B60Q 1/381* (2022.05); *B60Q 1/2607* (2013.01); *F21S 41/663* (2018.01); *F21S 43/249* (2018.01)

(58) Field of Classification Search
CPC .. B60Q 1/381; B60Q 1/2607; B60Q 2400/20; B60Q 2900/40; B60Q 2400/30;
(Continued)

(56) References Cited

U.S. PATENT DOCUMENTS 7,791,785 B2 *  9/2010  Knafou ............. B32B 17/10036
                                                      359/275
7,946,743 B2 *  5/2011  Natsume ................. F21S 43/14
                                                      362/509
(Continued)

FOREIGN PATENT DOCUMENTS

DE   10 2011 104214 A1   12/2012
DE   11 2014 003091 T5    3/2016
(Continued)

OTHER PUBLICATIONS

International Search Report for Application No. PCT/US2023/065757, dated Jul. 5, 2023, 7 pgs.

*Primary Examiner* — Eric Blount
(74) *Attorney, Agent, or Firm* — Young Basile Hanlon & MacFarlane, P.C.

(57) ABSTRACT

A light system comprising: a first light blade; a second light blade; a plurality of first light sources directing light into the first light blade in a first direction; a plurality of second light sources directing light into the first light blade, the second light blade, or both so that the light exiting the first light blade, the second light blade, or both extends in a second direction that is substantially normal to the first direction away from a vehicle housing the light system; wherein the plurality of first light sources and the plurality of second light sources provide a light function; and wherein the plurality of first light sources, the plurality of second light sources, or both are configured to illuminate in sequence so that the first light blade, the second light blade, or both are illuminated from a first edge toward a second edge.

20 Claims, 6 Drawing Sheets

(51) Int. Cl.
*F21S 41/663* (2018.01)
*F21S 43/249* (2018.01)

(58) Field of Classification Search
CPC .... B60Q 1/2696; F21S 41/663; F21S 43/249;
F21S 43/15; F21S 43/14; F21S 43/239;
F21S 43/245; F21S 43/26; F21S 41/24;
F21S 10/02; F21S 41/28; F21S 41/143;
F21S 41/148; F21S 43/235; F21S 43/236;
F21W 2103/20; F21W 2103/55; G02B
6/0018; G02B 6/00; G02B 6/001; G02B
6/0045; F21Y 2105/10; F21Y 2113/13
USPC ......................................................... 340/478
See application file for complete search history.

(56) References Cited

U.S. PATENT DOCUMENTS

| | | | | |
|---|---|---|---|---|
| 9,360,183 | B2 * | 6/2016 | Ichikawa | F21S 43/239 |
| 9,726,809 | B2 * | 8/2017 | Sato | G02B 6/0078 |
| 9,958,124 | B2 * | 5/2018 | Izawa | F21S 43/26 |
| 11,499,689 | B1 * | 11/2022 | Munoz Ledo Espinosa | B60Q 1/2607 |
| 11,713,857 | B1 * | 8/2023 | Darlage | F21S 41/28 |
| | | | | 362/618 |
| 2006/0146555 | A1 * | 7/2006 | Inaba | F21S 43/239 |
| | | | | 340/475 |
| 2009/0051523 | A1 * | 2/2009 | Perkins | B60Q 1/2603 |
| | | | | 340/478 |
| 2010/0327747 | A1 * | 12/2010 | Harris | B60Q 1/2607 |
| | | | | 315/77 |
| 2012/0081915 | A1 * | 4/2012 | Foote | B60Q 1/2696 |
| | | | | 362/494 |
| 2013/0242586 | A1 * | 9/2013 | Huizen | F21S 43/249 |
| | | | | 362/494 |
| 2016/0369967 | A1 * | 12/2016 | Nakada | G02B 6/0075 |
| 2016/0369969 | A1 * | 12/2016 | Tokieda | B60Q 1/381 |
| 2019/0032884 | A1 * | 1/2019 | Martus | F21S 43/15 |
| 2019/0162383 | A1 * | 5/2019 | Kim | F21S 43/249 |
| 2020/0189449 | A1 * | 6/2020 | Jeon | B60Q 3/85 |

FOREIGN PATENT DOCUMENTS

| | | |
|---|---|---|
| DE | 10 2018 009353 A1 | 5/2019 |
| DE | 20 2019 003710 U1 | 10/2019 |
| DE | 10 2019 109740 A1 | 10/2020 |
| EP | 3 674 138 A1 | 7/2020 |
| JP | 2021 005533 A | 1/2021 |
| WO | 2012005412 A1 | 1/2012 |

* cited by examiner

BI-DIRECTIONAL LIGHT SYSTEM

CROSS-REFERENCE TO RELATED APPLICATION(S)

This application claims priority to and the benefit of U.S. Provisional Patent Application Ser. No. 63/334,783, filed Apr. 26, 2022, the entire disclosure of which is hereby incorporated by reference.

FIELD

The present teachings relate to a light system that provides light in two or more direction and the light is configured to illuminate such that the light in the two or more directions appears to be moving.

BACKGROUND

Vehicles include many different types of lights. Some types of lights included on a vehicle are low beam headlights, high beam headlights, taillights, turn signal lights, fog lights, running lights, or a combination thereof. Each of these lights extend out of an outer surface of a vehicle so that they provide light for the driver or provide notice to surrounding drivers. These light systems generally direct light outward from the vehicle.

Examples of light systems may be disclosed in U.S. Patent Application Publication Nos. 2009/0051523 and 2010/0327747 and International Patent Application No. WO2012005412 all of which are expressly incorporated herein by reference for all purposes. Thus, there is a need for a light system where lights are illuminated in two or more directions. There is a need for a system where a single lens is illuminated in two planes. There is a need for a system where a light is animated in two different directions in series or simultaneously. It would be desirable to have a light system where multiple different light colors are extendable through a single lens in multiple directions.

SUMMARY

The present teachings provide: a light system comprising: a first light blade; a second light blade; a plurality of first light sources directing light into the first light blade in a first direction; a plurality of second light sources directing light into the first light blade, the second light blade, or both so that the light exiting the first light blade, the second light blade, or both extends in a second direction that is substantially normal to the first direction away from a vehicle housing the light system; wherein the plurality of first light sources and the plurality of second light sources provide a light function; and wherein the plurality of first light sources, the plurality of second light sources, or both are configured to illuminate in sequence so that the first light blade, the second light blade, or both are illuminated from a first edge toward a second edge.

The present teachings provide: a light system comprising: a first light blade; a second light blade; a plurality of first light sources directing light into the first light blade in a first direction; a plurality of second light sources directing light into the first light blade, the second light blade, or both so that the light exiting the first light blade, the second light blade, or both extends in a second direction that is substantially normal to the first direction away from a vehicle housing the light system; and a controller in communication with the plurality of first light sources, the plurality of second light sources, or both wherein the plurality of first light sources and the plurality of second light sources provide a light function; and wherein the plurality of first light sources, the plurality of second light sources, or both are illuminate in two different directions.

The present teachings provide a light system where two or more lighting functions are incorporated adjacent to one another and one lighting function may operate without any light being visible through the adjacent lighting functions. The present teachings provide a system where light is prevented from bleeding though a texture shutoff region without extending through a textured region. The present teachings provide a system where each portion of the light system are visibly separate so that light from one does not illuminate another. The present teachings provide a light system comprising a texture shutoff that prevents flash during the manufacturing and does not emit light without the light passing through a textured portion.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project light in a forward direction, rear direction, side direction, vertical direction (e.g., z-axis), from a fore to an aft, an aft to a fore, or a combination thereof. Preferably, the light system projects a light from an external surface of the vehicle to a location in front of the vehicle or at an angle relative to the front or rear of a vehicle. The light system may direct some light at the ground. The light system may direct some light above the ground. The light system may be integrated into a front end, a rear end, or both of a car. The light system may be an assembly. The light system may be a sealed light system that is integrated into a vehicle. The light system may be a sub-assembly that is included in a larger light system. The light system may be integrated into another light system and may function to be part of the light system. The light system may project light out of the vehicle. The light systems may be multiple light systems or light sources stacked one above the other, side by side, within different planes, within a same plane and projecting in different direction, integrated into a single light system, or a combination thereof. The light system may have multiple smaller light systems or light sources. The plurality of light systems or lights may be located in one light system. The plurality of light systems may operate independently of one another such that one light system may not affect another light system or portion of the light system. The light of the vehicle may be two or more, three or more, or four or more light systems located adjacent one another. The light system may be or include one or more bi-directional light systems.

The bi-directional light system functions to project light in at least two directions or two planes. The bi-directional light system may provide a single light function. The bi-directional light system may provide light from a plurality of light sources in two directions simultaneously. The light extending in the two directions may extend at an angle relative to one another. The angle may be about 15 degrees or more, about 30 degrees or more, about 45 degrees or more, about 60 degrees or more, about 75 degrees or more, or about 90 degrees or more. The angle may be about 180 or less, about 175 degrees or less, about 160 degrees or less, about 145 degrees or less, about 115 degrees or less (e.g., about 90 degrees). For example, light may be directed in the x-direction and the z-direction simultaneously. The light sources and the light direction may be coplanar (e.g., the light blade does not reflect, refract, bend, or a combination thereof) the light from the light source.

The light sources function to produce light. The light source may be a device or a plurality of devices that create light and the light extends outward from the light source. The light source may produce a high beam, a low beam, a blending beam, a running light, a day time light, a turn signal, a brake light, or a combination thereof. The light sources may have different functions. For example, one light source may provide a running light and another light source may be a turn signal. The light source may comprise a plurality of lights or may be a single light source within a set of light sources. The plurality of lights may be in one set or group of light sources. The light source may be a single light that projects light. In another example, a light source may direct light in a first direction and a second light source may direct light in a second direction that is different from the first direction. The first direction may be along a z-axis within a coordinate system. The second direction may be along an x-axis within a coordinate system. Two different light sources may be part of a single light system or a portion of a single light system. Two different light sources may be combined to form a bi-directional light system. The light source may include a laser diode, glowing phosphor, filament bulb, a light emitting diode, a halogenated light, a xenon light, or a combination thereof. One or more light sources may produce one light function and one or more second light sources may produce a second light function, a third light function, or both. For example, the light functions may be a day time running light, turn signal, personalized lighting, or a combination thereof.

The first light function and the second light function may be different functions. The first light function and the second light function may operate at the same time. The first light function and the second light function may operate at different times. The first light function and the second light function may be optically isolated. The first light function and the second light function may be mechanically connected. The first light function and the second light function may be located on a same side of a vehicle or adjacent sides of a vehicle. The first light function and the second light function may both be located in a front of a vehicle or in a rear of a vehicle. The first light function and the second light function may provide different colored lights. The system may be located in corners of the vehicle (e.g., drivers side front and passenger side front). The first light function may be a daytime running light. The second light function may be a turn signal. Each of the light functions may include independent light sources. The first light function and the second light function may extend through a same lens, a single lens, or multiple lenses.

The light sources may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light source may be a single lamp or bulb. Preferably, the light source is part of a set of light sources that includes a plurality of lamps, bulbs, diodes, or a combination thereof. The light source may be part of a set of light sources that includes 2 or more, 3 or more, 4 or more, 5 more, 7 or more, 9 or more, or 11 or more light sources that produce light and combine together to form the light extending from the light system. The sets of light sources may include 20 or less, 18 or less, 16 or less, or 14 or less devices that produce light (e.g., each set may include 8 light sources or alternatively all of the sets when combined together may include 8 light sources or 2 light sources). For example, the set of light sources may be the contents of a single printed circuit board that perform a same lighting function and the set of light sources may be 8 light sources. The number of light sources in a part of the light may dependent upon a size of the region or a size illuminated. For example, a day time running light may have eight or more light sources and a turn signal may have five or more light sources. Thus, the light source may be one or more lights, two or more lights, or three or more lights. The light source may be static. The light sources may be free of movement. The light source may be fixed. The light sources may be static and may be manually or physically adjusted so that the light sources are directed to a desired location. The light sources may be fixed and the light from the light source may be moved, bent, directed, or a combination thereof by optical elements, textured portions, micro optics, or reflectors (e.g., a light guide). Each device (e.g., light or LED) of the light source may be turned on and off. The light sources may be illuminated in a sequence. For example, the light sources may turn on in an order so that the lights appear to move in a direction (e.g., from a center of the vehicle to an edge of the vehicle). The light source may be located within a light system at a location relative to a light guide. Two or more light sources may combine together to form a bi-directional system. Each light guide may receive light from a single light source. The light sources may work together as a set of light sources to create light.

The set of light sources function to fill a light bar, a lens, an outer housing, an outer lens, light blade, or a combination thereof with light so that the light bar, lens, outer housing, light blade, or a combination thereof project light to perform some function. The set of light sources may be a single function (e.g., a high beam, a low beam, a blending beam, a running light, a day time light, a turn signal, a brake light, or a combination thereof). Each set of light sources may perform a single function. Preferably, some of the light systems may include two or more sets of light sources, three or more sets of light sources, or even four or more sets of light sources that provide two, three, or four directions of light respectively. For example, light may extend in two directions (e.g., x-direction and z-direction). The light sources may extend in a row, in a column, or a combination of both. Each of the sets of light sources may perform a different function or provide a different type of light. All of the lights within a set of light sources may provide the same light (e.g., color, color temperature, or wavelength). For example, one set of light sources may be yellow, orange, or red and a second set of light sources may be white (e.g., OEM white, off white, pure white, or crystal white (e.g., having a color temperature between 4300K and 6000K)). The color, intensity, temperature, or a combination thereof may vary from set to set depending on the function of the set of light sources. For example, if one set of light sources is directed to a turn signal then the color may be orange whereas if the set of light sources is for a brake light then the color may be red. The light from the light system may be directed to a predetermined location depending on a function of the light from that set of light sources. For example, a running light may be directed outward in front of a vehicle whereas a turn signal may be directed at a 45 degree angle so that a portion of the light is visible in a front of the vehicle and a portion of the light is visible from a side of the vehicle.

The light from each of the light sources may extend outward from the light source at an angle towards an inboard side and an outboard side. Each of the sets of light sources or functions of the light sources may be spaced apart by an axis. For example, a first function may extend along a first side of the axis and a second function may extend along a second side of the axis. An angle the light extends on an inboard side and an outboard side of the optical axis may be varied based on a shape of a reflector.

The light from the first light function and the light from the second light function may extend through a lens. The first light function and the second light function may have discrete lenses that are spaced apart. The first light function and the second light function may have mechanically connected lenses. The first light function and the second light function may have optically separated lenses. The first light function and the second light function may each have a lens with a clear portion, a textured portion a texture shutoff, a portion of a blocker, or a combination thereof. The first light function and the second light function may each have one or more lenses (e.g., internal lenses), one or more light blades, or both.

A light blade may be a lens that permits light to extend into two or more directions. The light blade may extend along an x-axis, along a y-axis, along a z-axis. The light blade may be generally square, rectangular, cubic, a cuboid, a rectangular prism, or a combination thereof. The light blade has an x-direction length along the x-axis, a y-direction length along the y-axis, and a z-direction length along the z-axis. The length in the x-direction and in the y-direction may be greater than the length in the z-direction. The light blade in the z-direction may be substantially planar. The light blade may permit light to extend therethrough in two or more directions. For example, light may extend through the light blade in an x-direction and in a z-direction. The light blade may be substantially clear. The light blade may be covered on one or more sides by a baffle or blocking portion. The baffle or blocking portion may prevent light from extending into the light blade or into a region of a light blade. The baffle or light blocker may be opaque. The baffle or light blocker may include recesses that allow light to extend there through into the light guide. The baffle or light blocker may be located between the light blade and the light sources (e.g., lights) so that light only extends into the light blade in a single direction or through a single surface. The light blocker may be internally located within a light blade.

The light blade may have 6 or more surfaces. The light blade may have a top, bottom, left, right, fore, and aft. Light may extend through the light blade in a first light direction and out of the light blade in the first direction or in a second direction. The light may extend out of a first surface of the light blade in a first light direction, a second light direction, third light direction, or a combination thereof. A single light may extend out of each light blade. Two or more lights may extend out of a single light blade. Three or more lights may extend our of a single light blade. Each light may extend our of its own light blade. For example, a first light may extend out of a first light blade and a second light may extend our of a second light blade. The light may extend orthogonally between two surfaces of the light blade. For example, the light may extend orthogonally relative to and between the top and bottom, left and right, or fore and aft surfaces.

Light may extend out of the light blade so that the light appears to be moving in one or more directions, two or more directions, or even three or more directions. The lights when illuminated (e.g., fired) may illuminate from a first side to a second side. The lights when illuminated may illuminate along two surfaces simultaneously. For example, the lights may extend through a first surface (e.g., a front of the light blade) and a second surface (e.g., a top of the light blade at a same time and the light may be illuminated in a sequence or series such that the light appears to be moving. The lights may be illuminated from left to right, right to left, fore to aft, aft to fore, in lines, in rows, or a combination thereof. The lights when illuminated may make the light blade or the light system appear to be moving, dancing, form patterns, form sequences, or a combination thereof. The lights may be controlled by one or more controllers.

The controllers function to control the light individually. The controller may be part of the vehicle, part of the light system, or both. A single controller may control all of the lights. The controller may illuminate (e.g., fire) the lights in a sequence, individually, in a pattern, a predetermined manner, a predetermined sequence, randomly, or a combination thereof. The controller may illuminate lights so that light extends in two or more directions. The controller may be programmable, include pre-set programs, or both. The controller may be accessed inside of the vehicle so that the user can change the illumination settings of the light system. The controller may control the lights so that the lights are directed through the light blade in two or more directions. The controller may control the first light sources and the second light sources.

The light may extend at an angle relative to a road surface. When the light extends out of the first surface (e.g., top) the light may be projected at an angle that is both upward and outward (e.g., in a fore direction) relative to a road surface. The first surface and the second surface of the light blade may be perpendicular or substantially perpendicular to one other. The angle relative to the road surface may be about 5 degrees or more, about 10 degrees or more, about 15 degrees or more, or about 25 degrees or more. The angle relative to the road surface may be about 90 degrees or less, about 75 degrees or less, about 60 degrees or less, about 45 degrees or less, or about 30 degrees or less. The lights may light up the light blade through the first surface so that the first surface is illuminated in a fore aft direction. The light may extend through the first surface so that the light extends through the top in a fore direction and a z-axis direction. For example, the lights on the fore side of the light blade may illuminate first and then the lights in an aft direction may illuminate. The light may extend at an angle between the z-axis and the road surface to illuminate items forward of the vehicle, provide notice, or both. A plurality of lights from a plurality of light sources may extend through the first surface. A plurality of lights may be visible through the first surface simultaneously. Light may extend through the first surface in rows and columns. The light from the first surface may appear as one solid beam of light. The light from the first surface may extend in a first light direction that is different from light that extends from the second surface in a second light direction.

The second surface may be located adjacent to the first surface. The second surface and the first surface may be right angles relative to one another. The second surface may generally face in a forward direction (or towards the fore of the vehicle). The second surface may be the fore surface. The second surface may be directly opposite an aft surface, a left surface, or a right surface. The second surface may be parallel to an opposing surface. For example, if the second surface is the fore surface then the fore surface is opposite the aft surface, and the fore and aft surface may be generally parallel to one another. The light extending in the second light direction may extend out of the second surface at an angle. The angle may be any angle such that the second light direction is generally parallel to a driving surface. The second surface (and second light direction) may be angled towards the road surface. The angle relative to the road surface may be about 1 degree or more, about 5 degrees or more, about 10 degrees or more, or about 15 degrees or more. The angle relative to the road surface may be about 90 degrees or less, about 75 degrees or less, about 60 degrees or less, about 45 degrees or less, about 30 degrees or less, or about 20 degrees or less. The angle may an angle such that the light projects outward the one or more lenses and into contact with the road surface.

A single light blade may provide the two or more lights that extend in the two or more directions. Multiple light blades may be combined. One light blade may provide a first light and a second light blade may provide a second light blade. For example, a first light may generate a primary light and a second light may generate a secondary light or vice versa. The first light blade and the second light blade may be spaced apart. The first light blade and the second light blade may be mechanically connected together. The first light blade and the second light blade may be one monolithic piece. The first light blade may extend in a first plane and the second light blade may extend in a second plane. The first light blade may direct light in a first direction and the second light blade may direct light in a second direction. The first light blade may extend from an edge or side of a second light blade or vice versa. The first light blade, the second light blade, or both may be aligned with one or more lenses so that light may be directed outward from the light system.

The one or more lenses function to direct the light from the reflectors, light blades, or both to a location to be illuminated. An outer lens may extend over an internal lens (e.g., a light blade). The lenses may function to protect the light emitting portion, the light blades, or both. The lenses may bend light. The lenses may refract light. The lenses may collimate the light, The lenses may diffuse the light, blend the light, spread the light, direct the light to a predetermined location, create one or more hot spots, create a homogeneous lighting appearance, prevent hot spots, or a combination thereof. The lens may be located in front of the light emitting portion or a portion of the light blade that transmits light. The lenses may cover all or a portion of the light system, the light source, light bars, or a combination thereof. Each light system may include a lens. The light system may include a single outer lens that covers each of the light bars, light sources, light blades, internal lenses, or a combination thereof that each provide or perform a different function. The lens may cover the light bar, light source, light blade, internal lenses, or a combination thereof so that light, direct light, reflected light, or a combination thereof extends through the lens. The lens may be one or more lenses. The lens may be a plurality of lenses. The lens (e.g., primary lens or internal lens) may be a single lens. The one or more lenses may have a shape that directs light to a predetermined location. The one or more lenses may be flat, planar, bio-convex, plano-convex, positive meniscus, negative meniscus, plano-concave, bio-concave, double convex, converging, diverging, or a combination thereof. Each lens may be a single lens. Each lens may be a compound lens (e.g., there may be more than one lens). Each lens has a forward side (or forward surface) and a rearward side (or rearward surface). The lenses may change a color or wavelength of the light extending through the lens. For example, the light source may generate white light and the white light may be converted into orange light as the light extends through the lens. The lens (e.g., light blade) may include one or more texture portions (e.g., micro-optics).

The texture portions function to prevent hot spots, provide a homogenous light pattern, a homogenous amount of light, spread the light, prevent overlaps of light from light sources, or a combination thereof. The textured pattern may provide a homogenous lighting appearance when the light is viewed from an external location of a vehicle, an internal location of a vehicle, or both. The texture portion may be added to a lens. For example, a texture may be sprayed on the lens, etched into the lens, mechanically added, mechanically formed, added during molding, or a combination thereof. The textured portions may be on an external surface, an internal surface, a location between the internal surface and the external surface, or a combination thereof. The texture portions may guide light out of the lens as the light travels through the lens. The texture portions may be formed while the lenses are being formed. Some lenses may include a texture portion on or in an external surface and an internal surface. The textured portions (e.g., micro-optics) may be located in a light blade, on a light blade, in an internal surface of a light blade, on an external surface of a light blade, or a combination thereof. The textured portions may permit light to extend out of the light blade, change directions within the light blade, or both. The textured portions may permit light to exit the light blade at predetermined locations, in predetermined directions. The texture portions on opposing surfaces may extend in a substantially parallel direction, in a direction complementary to a shape of the lens, or both. The texture portion may have a shape that is a pyramid, half circle, square, rectangle, zig zag patterns, lines, cylindrical, tetrahedron, cube, hexagonal, icosahedron, a prism, a pentagonal pyramid, a cone, cuboid, a symmetrical shape, an asymmetrical shape, a geometric shape, a non-geometric shape, or a combination thereof. The textured portion may form an outer surface or a lens. The textured portion may extend substantially a length, a width, or both of the lens. For example, the textured portion may terminate at a texture shutoff such that the textured portion does not extend the length and/or width of the textured shutoff.

A texture shutoff may prevent light from traveling between two locations of a lens or a light blade. The textured portion may be the only portion of the lens that light extends through. The textured portion may be free of hot spots. The textured portion may be free of contact with a blocker. The textured portion of a lens may stop before a blocker. A portion of the blocker may extend behind the textured portion but may be free of contact. The textured portion may terminate at a texture shutoff. The textured portions may be located opposite one or more printed circuit boards that include one or more light sources.

The light sources may be located on one or more printed circuit boards. The printed circuit boards (PCB) may provide power, signals, support, or a combination thereof to one or more light sources. The PCB may be fixed within a light system. Each PCB may be connected to a plurality of light sources. The PCB may be electrically connected, mechanically connected, or both to one or more light sources discussed herein. The PCBs may aim the light from the light sources. The PCBs may align a light source with a light guide.

The light guide functions to guide light from the light sources into the light blade. The light guide may be an edge or a light guide. The light guide may guide light into the light blade. The light guide may direct the light, spread the light, angle the light, or a combination thereof. The light guide may be a collimator. The light guide may collect light from a light source and direct the light into the light blade so that the light blade distributes the light to a location of interest. The light guide may guide light into a first light blade and then the first light blade may direct light into a second light blade. The light guide may direct a first light in a first direction. A second light may extend in a second direction. A second light may extend around the light guide, in a location other than through the light guide, or both.

Figure 1A:
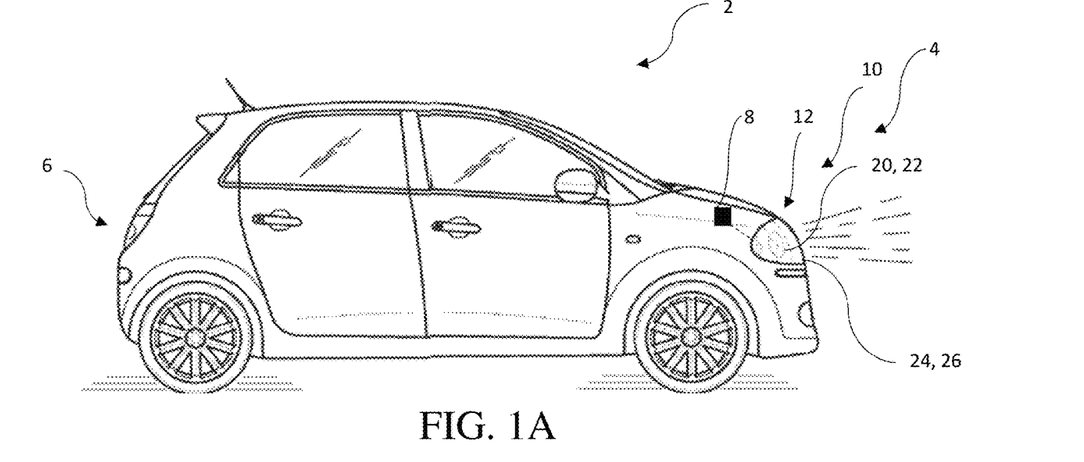
FIG. 1A is a side view of a vehicle including a light system.

FIG. 1A illustrates a side view of a vehicle 2 including light systems 10. The light systems 10 includes a first light function 20 and a second light function 24. The bi-directional light system 12, which provides the first light function 20, is located in a front of the vehicle 2 and is shown as a head light and/or a daytime running light 22. A second light function 24 is shown as a turn signal 26. The vehicle 2 and light systems 10 include a fore 4 and aft 6. A controller 8 is connected to the light system 10 to control the light system 10.

Figure 1B:
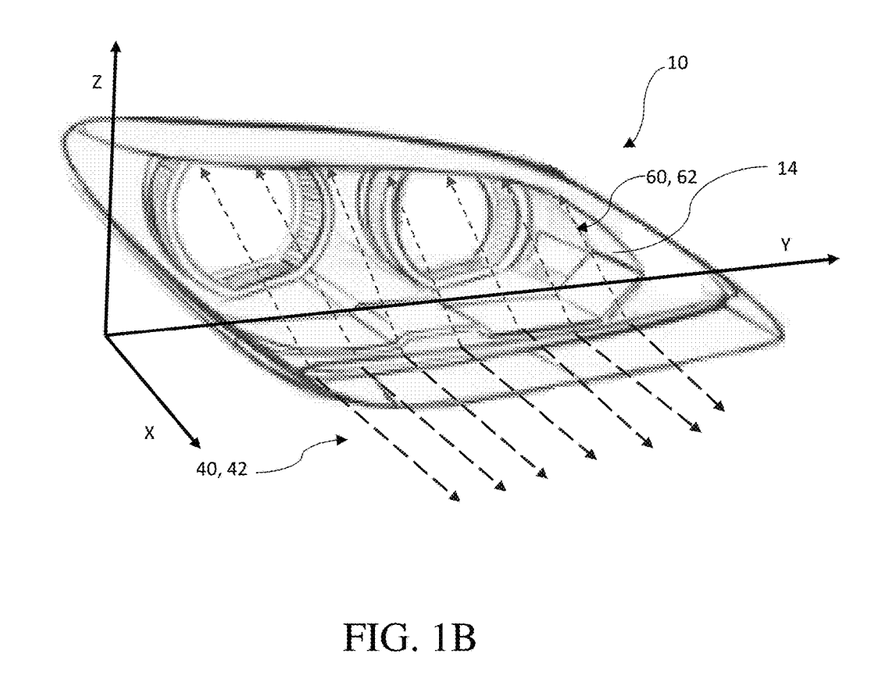
FIG. 1B is a close-up view of a light system

FIG. 1B is an isometric view of the light system 10. The light system 10 includes an outer lens 14. A primary light 42 is provided through the outer lens 14 in a primary light direction 40 that is substantially in the x-direction so that the primary light 42 extends out of the vehicle 10. A secondary light 62 is provided through the outer lens 14 in a secondary light direction 60 a substantially the Z-direction extending out of the vehicle 10.

Figure 2A:
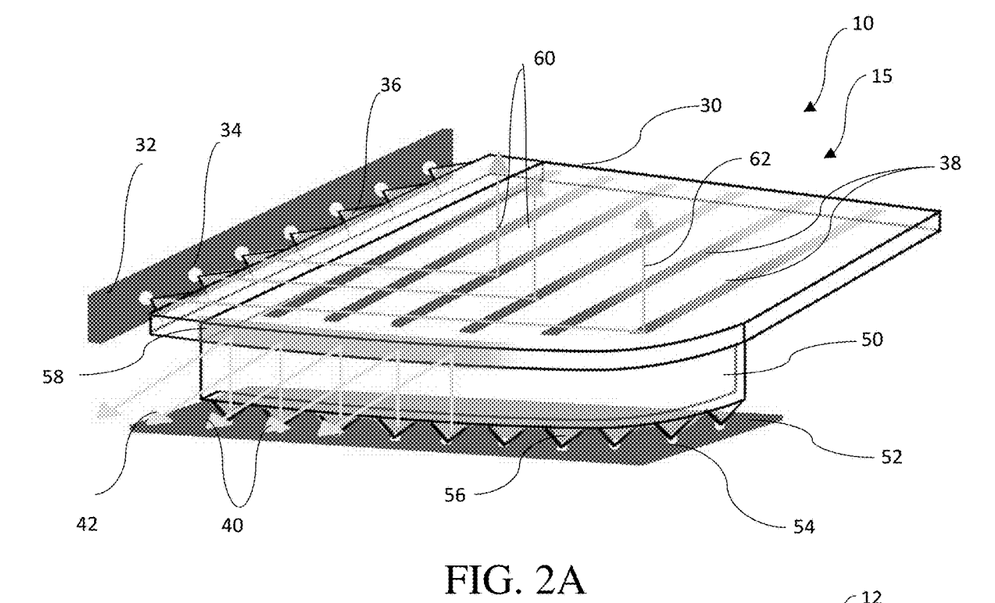
FIG. 2A is a front isometric view of a bi-directional light system.

FIG. 2A is an isometric view of a bi-directional light system 12 portion of a light system 10. The bi-directional light system 12 includes a first light blade 30 that extends in a first direction (within a first plane). The first light blade 30 extends generally in a fore aft direction and a secondary light 62 extends in a secondary light direction 60, which is a z-direction. Secondary light 62 is directed into the first light blade 30 in a secondary light direction 62 from a first direction where a first printed circuit board 32 includes first light sources 34 that each direct secondary light 62 into first light guides 36. Each of the first light sources 34 direct secondary light 62 into one of the first light guides 36 and then the secondary light 62 extends out of the first light blade 30 at a region with a first blade surface 38. The first blade surface 38 (e.g., a textured portion or micro-optic) directs secondary light 62 out of the first light blade 30 in a secondary light direction 60 so that the light is visible outside of a vehicle and the light system 10.

The bi-directional light system 12 includes a second light blade 50. The second light blade 50 extends in a direction different (within a different plane) than the first light blade 30. The second light blade 50 is aligned with a second printed circuit board 52 that includes second light sources 54 along the second printed circuit board 52. Each of the second light sources 54 are aligned with second light guides 56 that direct a primary light 42 from the second light sources 54 into the second light blade 50. The second light blade 50 includes a second blade surface 58 that directs the primary light 42 out of the second light blade 50 in a primary light direction 40. The primary light direction 40 extends outward from the light system 10 and a corresponding vehicle (not shown). As shown, the primary light direction 40 and the secondary light direction 60 are normal to one another and extend along different axes.

Figure 2B:
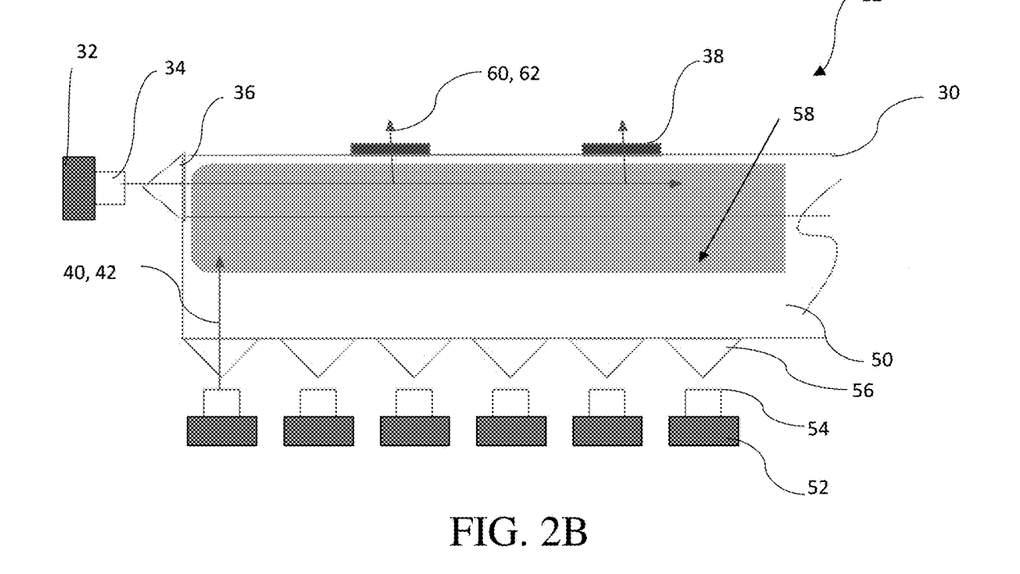
FIG. 2B is a front view of the bi-directional light system of FIG. 2A.

FIG. 2B is a front view the bi-directional light system 12 of FIG. 2A. The first light blade 30 is aligned with a first printed circuit board 32 including first light sources 34 with a first light guide 36. The first light guide 36 directs secondary light 62 from the first light sources 34 into the first light blade 30 and then the light extends out of the first light blade 30 through the first blade surfaces 38 in the secondary light direction 60. The second light blade 50 is aligned with a second printed circuit board 52 including second light sources 54. The second light sources 54 are aligned with second light guides 56. The primary light 42 from the second light sources 54 extends out of the second light blade 50 through second blade surfaces 58 in a primary light direction 40.

Figure 2C:
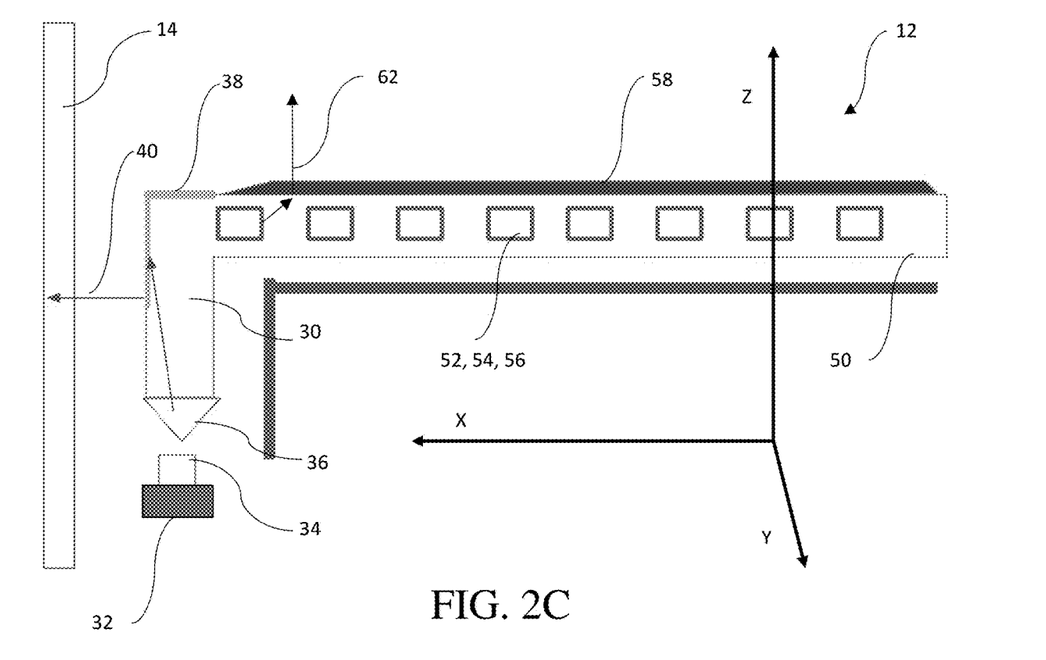
FIG. 2C is a side view of the bi-directional light system of FIG. 2A.

FIG. 2C is a side view of the bi-directional light system 12 of FIG. 2A. As shown, the primary light 42 extends from the first light sources 34 on the printed circuit board 32 into the first light guide 36 into the first light blade 30. The first light blade 30 includes a first blade surface 38 that redirects light from a z-direction into a x-direction that is the primary light direction 40 through the outer lens 14. Light extends from the second light sources 54 located on a second printed circuit board 52 into a second light guide 56 on a second light blade 50. The secondary light 62 extends in the y-direction into contact with a second blade surface 58 out of the second light blade 50 in a secondary light direction 60 along a z-direction.

Figure 3A:
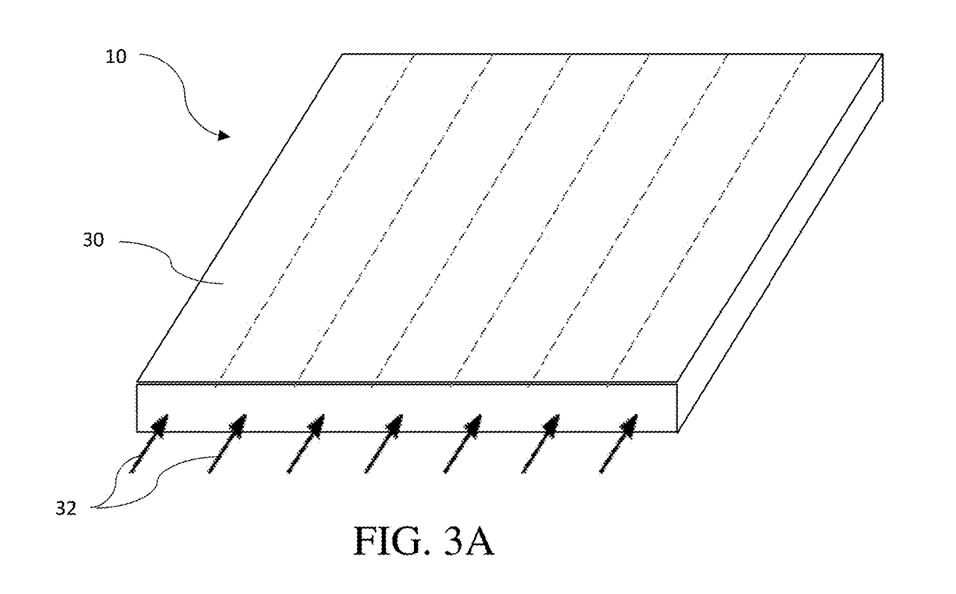
FIG. 3A is a perspective view of a bi-directional light system.

FIG. 3A is an example of a first light blade 30 comprising light extending in a first light direction 32 where the light extends through the first light blade 30 so that the light is visible outside of the light system 10.

Figure 3B:
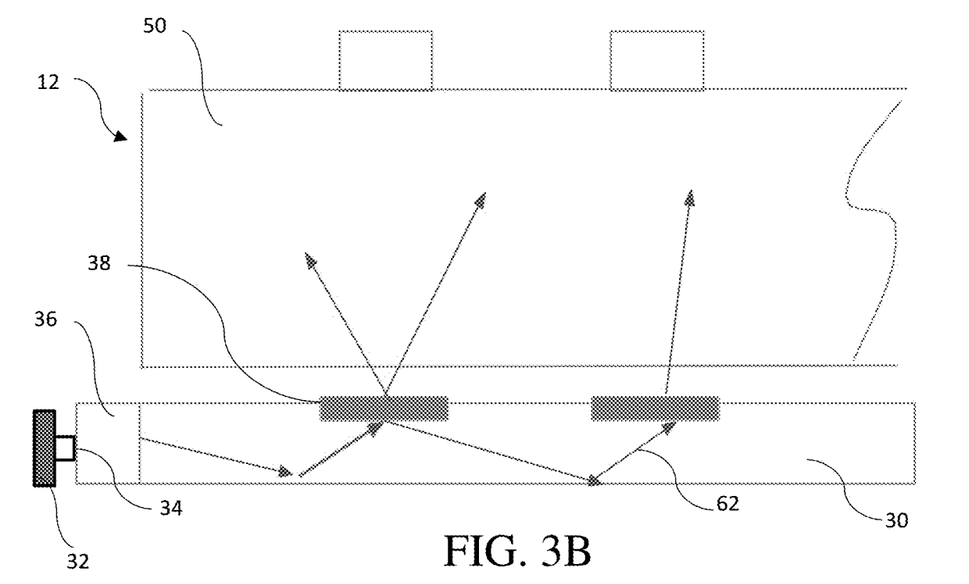
FIG. 3B is a front view of the bi-directional light system of FIG. 3A.

FIG. 3B is a side view of a bi-directional light system 12. The bi-directional light system 12 includes a first light blade 30 adjacent to the first printed circuit board 32 including first light sources 34 that provide secondary light 62 into first light guides 36. The first light guides 36 direct the secondary light 62 into the first light blade 30, which as shown is a collimator. The first light blade 30 includes first blade surfaces 38 (e.g., a textured portion or micro-optics) that guides the secondary light 62 into a second light blade 50 where the light is distributed.

Figure 3C:
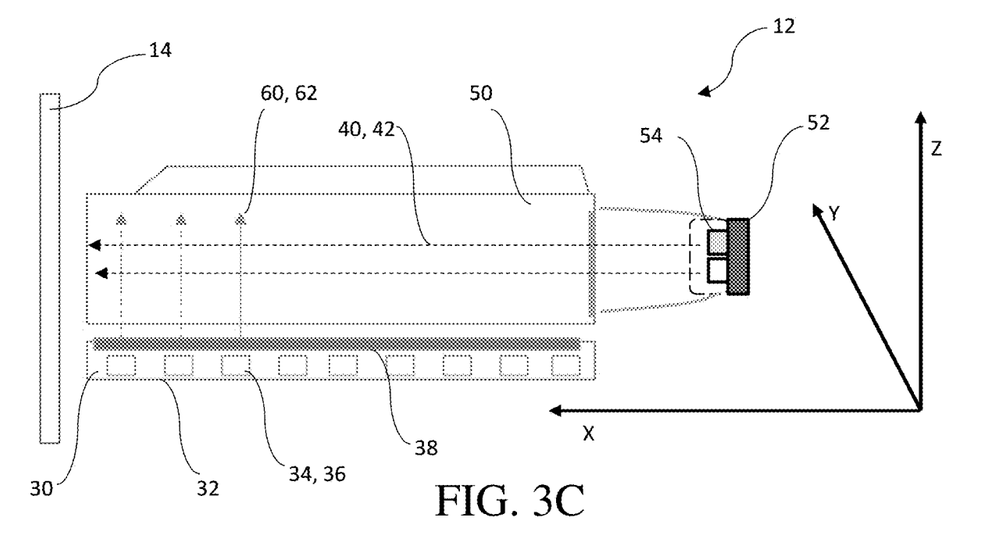
FIG. 3C is a side view of the bi-directional light system of FIG. 3A.

FIG. 3C is a second side view of the bi-directional light system 10 located adjacent an outer lens 14. The bi-directional light system 12 includes a first light blade 30 located under a second light blade 50. The first light blade 30 is located adjacent to a first printed circuit board 32 that includes first light sources 34 located proximate to and aligned with first light guides 36. The light guides 36 guide the secondary light 62 into the first light blade 30. The first light blade 30 acts as a collimator disbursing secondary light 62 in the y-direction until the secondary light 62 contacts a first blade surface 38 where the secondary light 62 extends therethrough in a secondary light direction 60 into the second light blade 50 in a z-direction. A second printed circuit board 52 includes second light sources 54 that directs a primary light 40 along a primary light direction 40, which is in the x-direction.

Figure 4A:
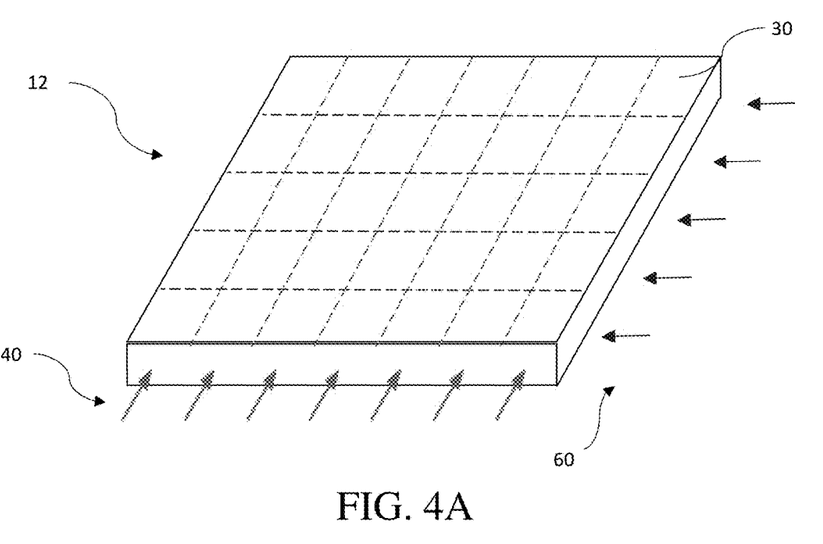
FIG. 4A is a perspective view of a bi-directional light system.

FIG. 4A is an isometric view of a first light blade 30 of a bi-directional light system 12 with light extending in a primary light direction 40 and a secondary light direction 60

Figure 4B:
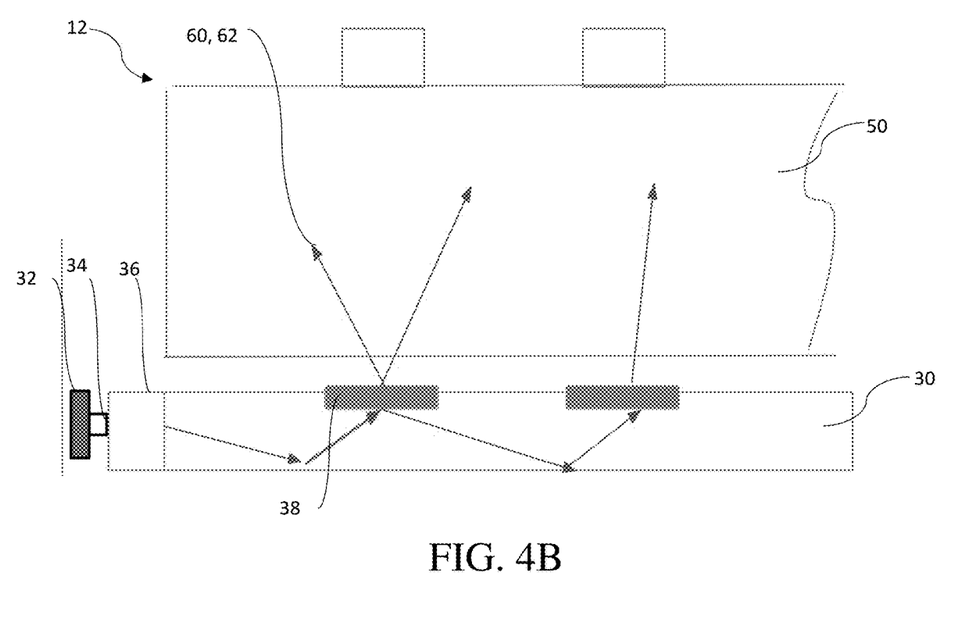
FIG. 4B is a front view of the bi-directional light system of FIG. 4A.

FIG. 4B is a side view of the bi-directional light system 12 showing a first light blade 30 and a second light blade 50 adjacent one another. The first light blade 30 is adjacent a first printed circuit board 32 including first light sources 34 directing secondary light 62 into first light guides 36. The secondary light 62 extends out of the first light sources 34 into the first light blade 30 that is shown as a collimator. The first light blade 30 comprises first blade surfaces 38 that permits the secondary light 62 to extend out of the first light blade 30 into the second light blade 50. The secondary light 62 extends through the second light blade in a secondary light direction 60 (e.g., z-direction).

Figure 4C:
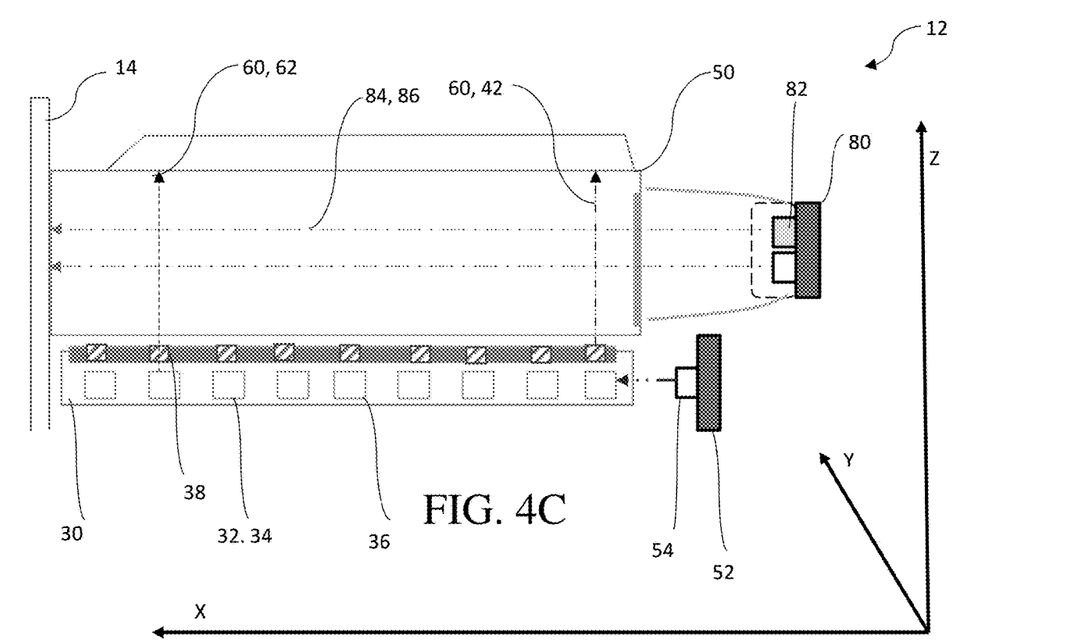
FIG. 4C is a side view of the bi-directional light system of FIG. 4A.

FIG. 4C is a second side view of the bi-directional light system 12. The bi-directional light system 12 has a first light blade 30 adjacent to a first printed circuit board 32. The first printed circuit board 32 includes first light sources 34 adjacent to first light guides 36. The first light guides 36 direct secondary light 62 into the first blade from the light sources 34. The secondary light 62 exits the first light blade 30 through the blade surfaces 38 into the second light blade 50 in a secondary light direction 60.

The bi-directional light system 12 includes a second printed circuit board 52 that includes second light sources 54. The second light sources 54 direct primary light 42 into the first light blade 30. The first light blade includes blade surfaces 38 (e.g., textured portion or micro-optics) that direct the light in a primary light direction 40 along the z-axis. The primary light direction 40 as shown is along the z-direction.

The light system 10 further includes a tertiary printed circuit board 80 including a plurality of tertiary light sources 82. The tertiary light sources 82 project tertiary light 86 through the second light blade 50 in the tertiary light direction 84 substantially in the x-direction.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Fore
6 Aft
8 Controller
10 Light System
12 Bi-Directional Light System
14 Outer Lens
20 First Light Function 22 Headlight/Daytime Running Light.
24 Second Light Function
26 Turn Signal
30 First Light Blade
32 First Printed Circuit Board
34 First Light Source
36 First Light Guide
38 First Blade Surface
40 Primary Light Direction
42 Primary Light
50 Second Light Blade.
52 Second Printed Circuit Board
54 Second Light Source
56 Second Light Guide
58 Second Blade Surface
60 Secondary Light Direction
62 Secondary Light
70 Light Blade
72 Light Direction
80 Tertiary Printed Circuit Board
82 Tertiary Light Source
84 Tertiary Light Direction

We claim:

1. A light system configured to be housed within a motor vehicle, the light system comprising:
   a first light blade configured to direct light along a first axis;
   a second light blade configured to direct light along a second axis;
   a plurality of first light sources directing light into the first light blade in a first direction;
   a plurality of second light sources directing light into the first light blade, the second light blade, or both so that the light exiting the first light blade, the second light blade, or both extends in a second direction that is substantially normal to the first direction away from the motor vehicle housing the light system; and
   an outer lens that extends over and covers the first light blade and the second blade;
   wherein the plurality of first light sources and the plurality of second light sources provide a light function; and
   wherein the plurality of first light sources, the plurality of second light sources, or both are configured to illuminate in sequence so that the first light blade, the second light blade, or both are illuminated from a first edge toward a second edge.

2. The light system of claim 1, wherein the second direction is substantially a z-direction of the motor vehicle.

3. The light system of claim 1, wherein the first light blade is substantially perpendicular to the second light blade.

4. The light system of claim 1, wherein the first light blade is substantially parallel to the second light blade.

5. The light system of claim 1, wherein the plurality of second light sources direct light into the second light blade.

6. The light system of claim 1, wherein the first light blade is a collimator that directs light through the first light blade.

7. The light system of claim 1, wherein the first light blade, the second light blade, or both comprise a blade surface.

8. The light system of claim 7, wherein the blade surface is a texture where light exits the first light blade, the second light blade, or both.

9. The light system of claim 8, wherein the texture is a surface texture that does not reflect light when contacted by light from the plurality of first light sources, the plurality of second light sources, or both.

10. The light system of claim 1, wherein the plurality of first light sources provide a portion of light to form a daytime running light.

11. The light system of claim 1, wherein the plurality of second light sources provide a portion of light to form a daytime running light.

12. The light system of claim 1, wherein a plurality of tertiary light sources provide light in a tertiary light direction.

13. The light system of claim 1, wherein the plurality of first light sources direct light into the first light blade at a first angle and the plurality of second light sources direct light into the first light blade at a second angle that is different than the first angle.

14. The light system of claim 13, wherein the first angle and the second angle are 90 degrees relative to one another.

15. The light system of claim 13, wherein the first angle and the second angle intersect within the first light blade.

16. The light system of claim 1, wherein the first light blade includes a plurality of first light guides that align with each of the plurality of first light sources.

17. The light system of claim 1, wherein the first light blade is one monolithic piece.

18. The light system of claim 2, wherein the plurality of second light sources extend along an x-direction of the motor vehicle.

19. The light system of claim 7, wherein the blade surface forms lines within the first light blade, the second light blade, or both.

20. A light system configured to be housed within a motor vehicle, the light system comprising:
   a first light blade extending in a direction from an aft of the motor vehicle toward a fore of the motor vehicle;
   a second light blade located adjacent to the first light blade;
   a plurality of first light sources directing light into the first light blade in a first direction that is a z-direction;
   a plurality of second light sources directing light into the first light blade, the second light blade, or both so that the light exiting the first light blade, the second light blade, or both extends in a second direction that is in an x-direction, which is substantially normal to the first direction so that the light extending in the second direction extends away from the motor vehicle that houses the light system; and
   a controller in communication with the plurality of first light sources, the plurality of second light sources, or both
   wherein the plurality of first light sources and the plurality of second light sources provide a light function; and
   wherein the plurality of first light sources, the plurality of second light sources, or both illuminate in in the first direction and the second direction which are two different directions.

* * * * *